(12) United States Patent
Kondou et al.

(10) Patent No.: US 9,059,614 B2
(45) Date of Patent: Jun. 16, 2015

(54) MULTI-GAP TYPE ELECTRIC ROTATING MACHINE

(71) Applicant: DENSO CORPORATION, Kariya, Aichi-pref. (JP)

(72) Inventors: Keiji Kondou, Toyota (JP); Shin Kusase, Obu (JP); Takeo Maekawa, Okazaki (JP)

(73) Assignee: DENSO CORPORATION, Kariya (JP)

( * ) Notice: Subject to any disclaimer, the term of this patent is extended or adjusted under 35 U.S.C. 154(b) by 421 days.

(21) Appl. No.: 13/667,075

(22) Filed: Nov. 2, 2012

(65) Prior Publication Data

US 2013/0113333 A1 May 9, 2013

(30) Foreign Application Priority Data

Nov. 4, 2011 (JP) ................. 2011-242204

(51) Int. Cl.
| | |
|---|---|
| *H02K 1/06* | (2006.01) |
| *H02K 1/16* | (2006.01) |
| *H02K 16/04* | (2006.01) |

(52) U.S. Cl.
CPC .. *H02K 1/16* (2013.01); *H02K 1/06* (2013.01); *H02K 16/04* (2013.01)

(58) Field of Classification Search
None
See application file for complete search history.

(56) References Cited

U.S. PATENT DOCUMENTS

| | | | |
|---|---|---|---|
| 4,755,698 A | 7/1988 | Frister et al. | |
| 5,744,895 A * | 4/1998 | Seguchi et al. | 310/266 |
| 7,791,245 B1 * | 9/2010 | Hao et al. | 310/266 |
| 7,830,064 B2 * | 11/2010 | Lee et al. | 310/266 |
| 8,860,281 B2 * | 10/2014 | Maekawa et al. | 310/266 |
| 2005/0285474 A1 * | 12/2005 | Kaneko | 310/266 |

FOREIGN PATENT DOCUMENTS

| | | |
|---|---|---|
| JP | 58-11941 | 7/1981 |
| JP | 62-225140 | 10/1987 |
| JP | 64-30644 | 2/1989 |
| JP | 2007-282331 | 10/2007 |
| JP | 2011-67070 | 3/2011 |

OTHER PUBLICATIONS

Office Action (2 pgs.) dated Oct. 22, 2013 issued in corresponding Japanese Application No. 2011-242204 with an at least partial English-language translation thereof (2 pgs.).

* cited by examiner

*Primary Examiner* — Tran Nguyen
(74) *Attorney, Agent, or Firm* — Nixon & Vanderhye P.C.

(57) ABSTRACT

In a multi-gap type electric rotating machine, side cores include an outside-side core connected to one end side of an outside core, and an inside-side core connected to one end side of an inside core. The outside-side core includes an outer-side rotor-opposite portion which projects from the inner periphery end of the outside core and is opposite to an end face at the outer periphery side of a rotor. The inside-side core includes an inner-side rotor-opposite portion which projects from the outer periphery end of the inside core and is opposite to an end face at the inner periphery side of the rotor. The outside-side core and the inside-side core are arranged so as to be opposed to each other in the radial direction thereof with a gap being interposed between the inner periphery end of the outer-side rotor-opposite portion and the outer periphery end of the inner-side rotor-opposite portion.

5 Claims, 15 Drawing Sheets

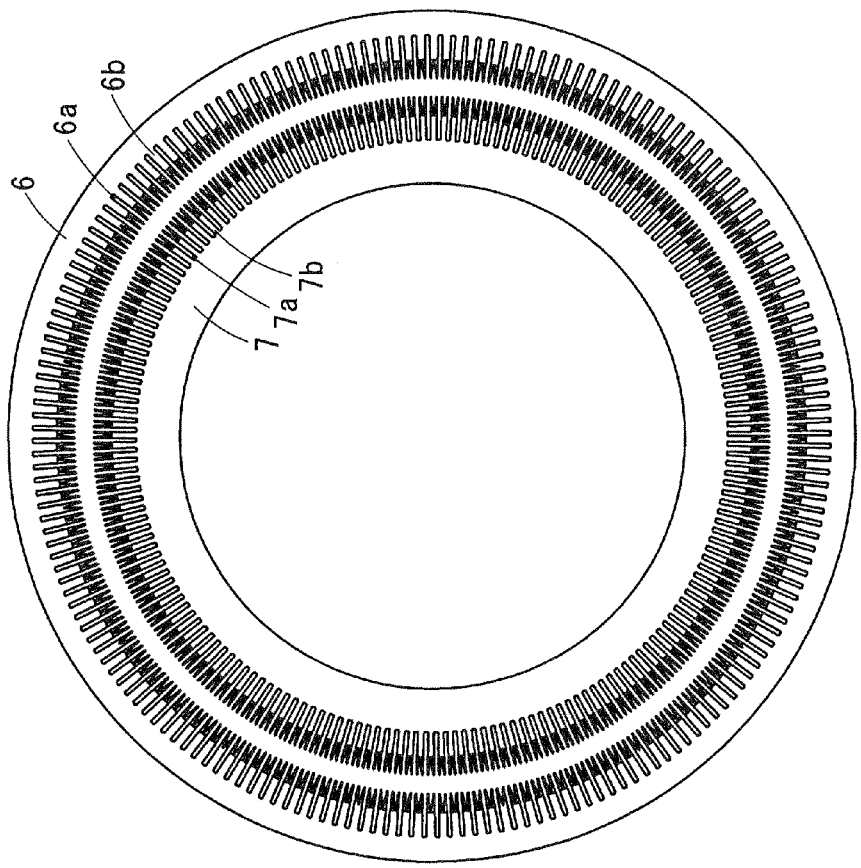
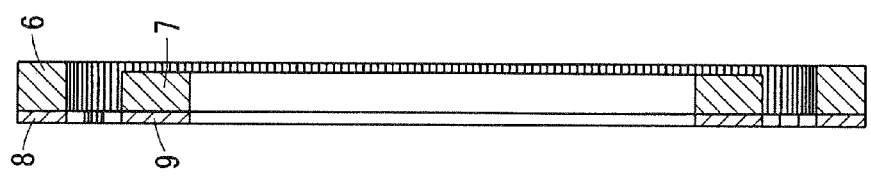

FIG.8
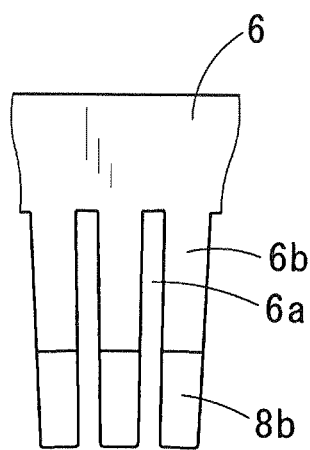
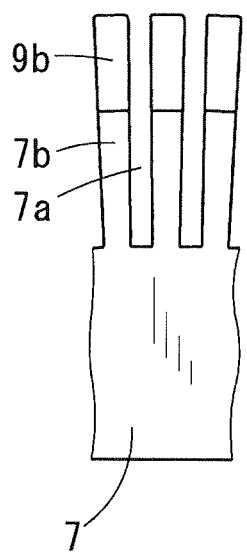

FIG.11A
CROSS-SECTIONAL RATIO: 60%
FIG.11B
CROSS-SECTIONAL RATIO: 80%
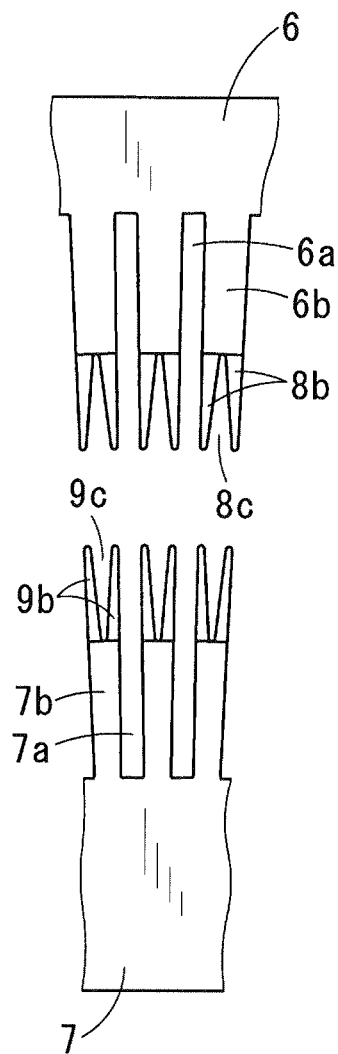
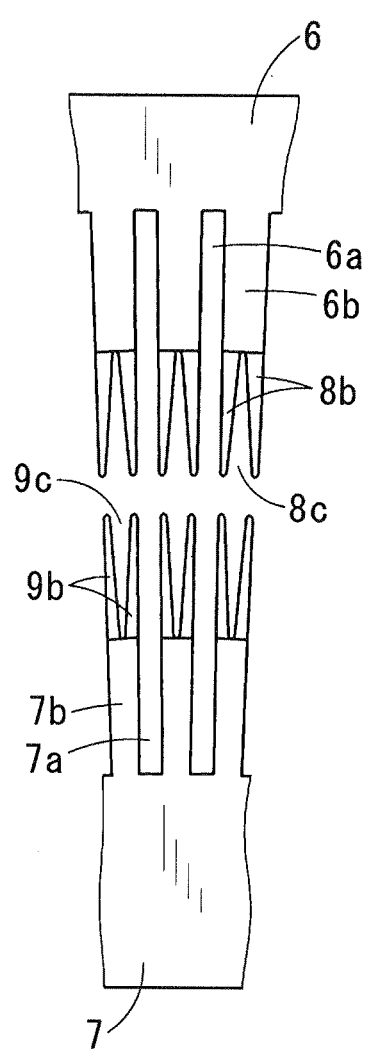

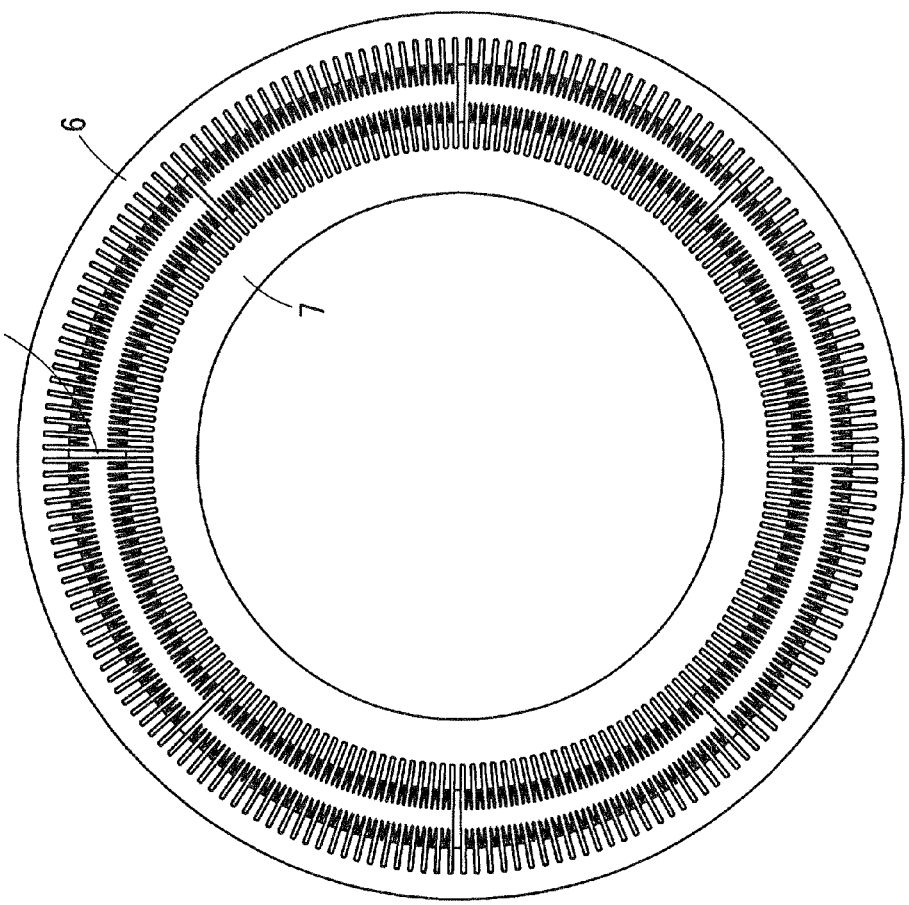
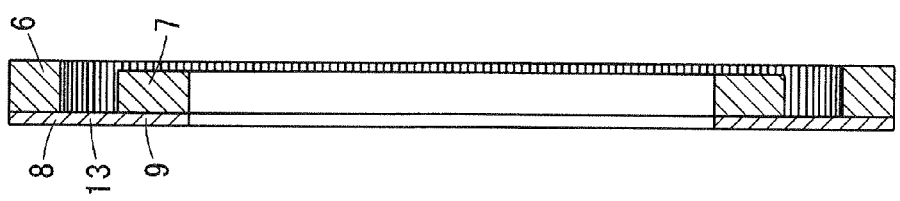

MULTI-GAP TYPE ELECTRIC ROTATING MACHINE

CROSS-REFERENCE TO RELATED APPLICATION

This application is based on and claims the benefit of priority from earlier Japanese Patent Application No. 2011-242204 filed Nov. 4, 2011, the description of which is incorporated herein by reference.

BACKGROUND

1. Technical Field

The present invention relates to a multi-gap type electric rotating machine which is used in, for example, a motor or a generator for a vehicle.

2. Related Art

As a conventional art, JP-A-2007-282331 discloses a double stator type motor. This double stator type motor has an annular rotor connected to a rotating shaft via a rotor disc, an inner stator disposed inside the rotor in the radial direction thereof, and an outer stator disposed outside the rotor in the radial direction thereof. In addition, double gaps are provided between the rotor and both the inner and outer stators and in the radial direction of the rotor. Thereby, higher torque can be generated compared with a single stator type motor.

To further increase the output of the motor, multiple gaps can be considered as the simplest way. That is, in addition to the gaps provided between the rotor and both the inner and outer stators and in the radial direction of the rotor, a side stator may be disposed at one end side of the rotor in the axial direction thereof to provide a gap in the axial direction. This is a way of providing three gaps.

However, the above-described multi-gap structure has not been in practical use. The main reason is that if an iron core of the side stator is formed of usual laminated steel sheets, eddy currents are generated in the lamination planes due to magnetic flux flowing in the laminated direction, which increases losses and significantly decreases the output of the motor.

In addition, as a method of decreasing losses, a so-called powder magnetic core, which is formed by pressurizing soft magnetic powder to which insulating coating is applied, may be used as material of the iron core of the side stator. However, the powder magnetic core has many problems in practice such as a decrease in output due to the magnetic properties thereof being lower than those of a magnetic steel sheet, an increase in manufacturing costs, and mechanical weakness which leads unreliability.

SUMMARY

An embodiment provides a multi-gap type electric rotating machine which can decrease the losses due to eddy currents to provide higher output.

As an aspect of the embodiment, a multi-gap type electric rotating machine is provided which includes: an annular rotor, a stator core which includes an outside core disposed at the outside of the rotor in the radial direction with a gap therebetween, an inside core disposed at the inside of the rotor in the radial direction with a gap therebetween, and side cores disposed at one end side in the axial direction of the rotor with gaps, and a stator coil which is wound around the stator core. The side cores include an outside side core connected to one end side in the axial direction of the outside core, and an inside side core connected to one end side in the axial direction of the inside core. The outside side core includes an outer side rotor opposite portion which projects from the inner periphery end of the outside core to the inside thereof and in the radial direction thereof and is opposite to an end face at the outer periphery side in the axial direction of the rotor. The inside side core includes an inner side rotor opposite portion which projects from the outer periphery end of the inside core to the outside thereof and in the radial direction thereof and is opposite to an end face at the inner periphery side in the axial direction of the rotor. The outside side core and the inside side core are arranged so as to be opposed to each other in the radial direction thereof with a gap being interposed between the inner periphery end of the outer side rotor opposite portion and the outer periphery end of the inner side rotor opposite portion.

BRIEF DESCRIPTION OF THE DRAWINGS

In the accompanying drawings:

FIG. 2A is a cross-sectional view of a stator core;

FIG. 2B is a plan view of a stator core;

FIG. 8 is a plan view showing a modification of the teeth shape;

FIG. 11A is a plan view showing a teeth shape having a cross-sectional ratio (aspect ratio) of 60%;

FIG. 11B is a plan view showing a teeth shape having a cross-sectional ratio of 80%;

FIG. 13A is a cross-sectional view of a stator core according to a third embodiment, in which an outside side core and an inside side core are connected via a bridge;

FIG. 13B is a plan view of the stator core according to the third embodiment;

DETAILED DESCRIPTION OF THE PREFERRED EMBODIMENTS

With reference to the accompanying drawings, hereinafter will be described embodiments of the present invention.

First Embodiment

In the first embodiment, a multi-gap type electric rotating machine is employed in an engine direct-connected type motor disposed between an engine and a gearbox of an automobile.

Figure 1:
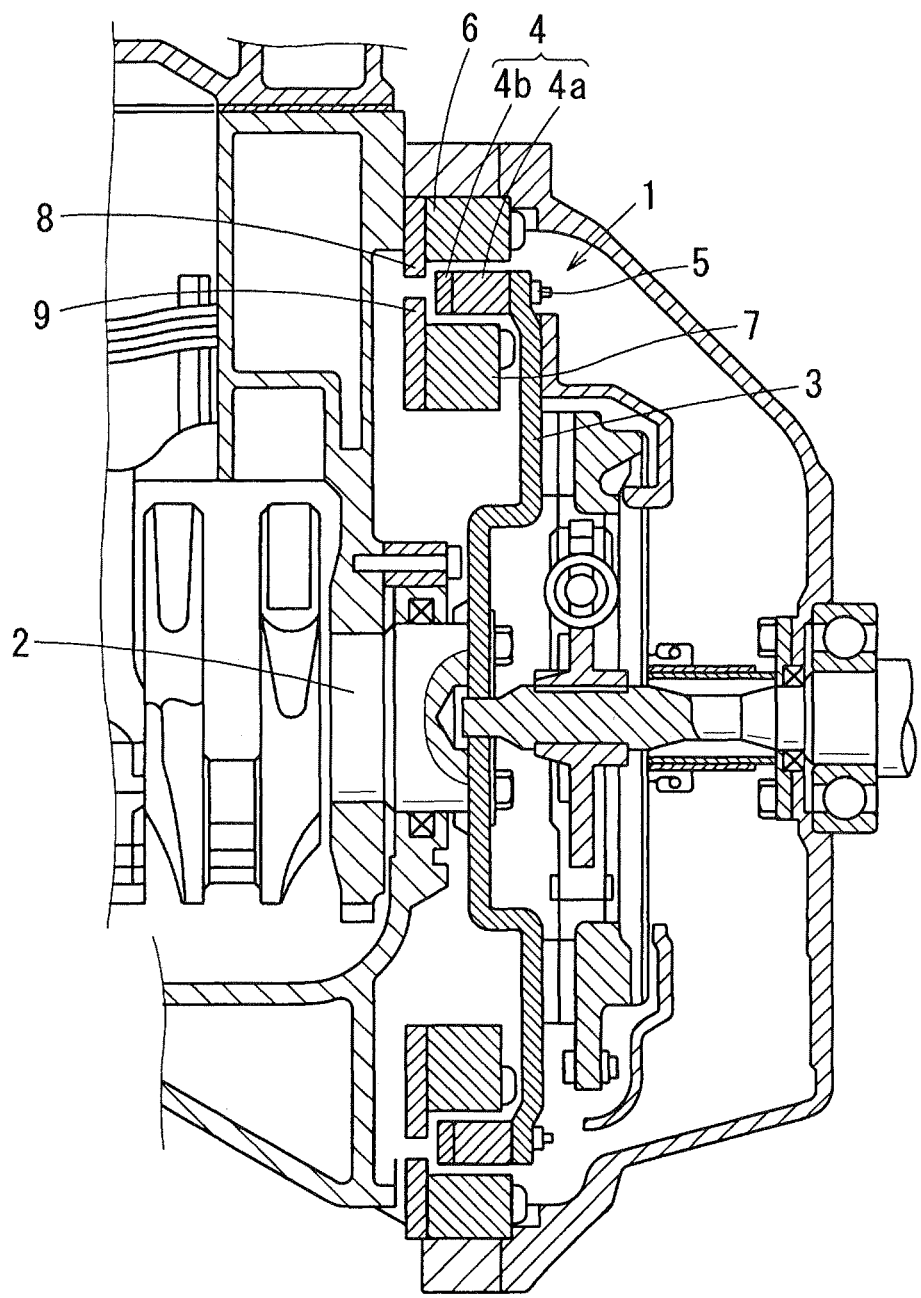
FIG. 1 is a cross-sectional view of a general structure of a motor in which an electric rotating machine is employed.

As shown in FIG. 1, a motor 1 includes an annular rotor 4, a stator core (described later), and a stator coil (described later). The rotor 4 is connected to a crankshaft 2 of the engine via a rotor disk 3. The stator core is disposed so that gaps are provided at the outer periphery side and the inner periphery side of the rotor 4 and one end side in the axial direction of the rotor 4, the gaps being interposed between the stator core and the rotor 4. The stator coil is wound around the stator core.

The rotor 4 includes, for example, a laminated core 4a and an end face core 4b. The laminated core 4a is formed by laminating core plates in which a plurality of segments are annularly connected. The end face core 4b is connected to one end face in the axial direction of the laminated core 4a. The rotor 4 is fixed to the rotor disk 3 by using a bolt 5 and the like.

The stator core includes an outside core 6, an inside core 7, and side cores 8, 9. The outside core 6 is disposed at the outside in the radial direction of the rotor 4. The inside core 7 is disposed at the inside in the radial direction of the rotor 4. The side cores 8, 9 are disposed at one end side in the axial direction of the rotor 4.

Figure 3:
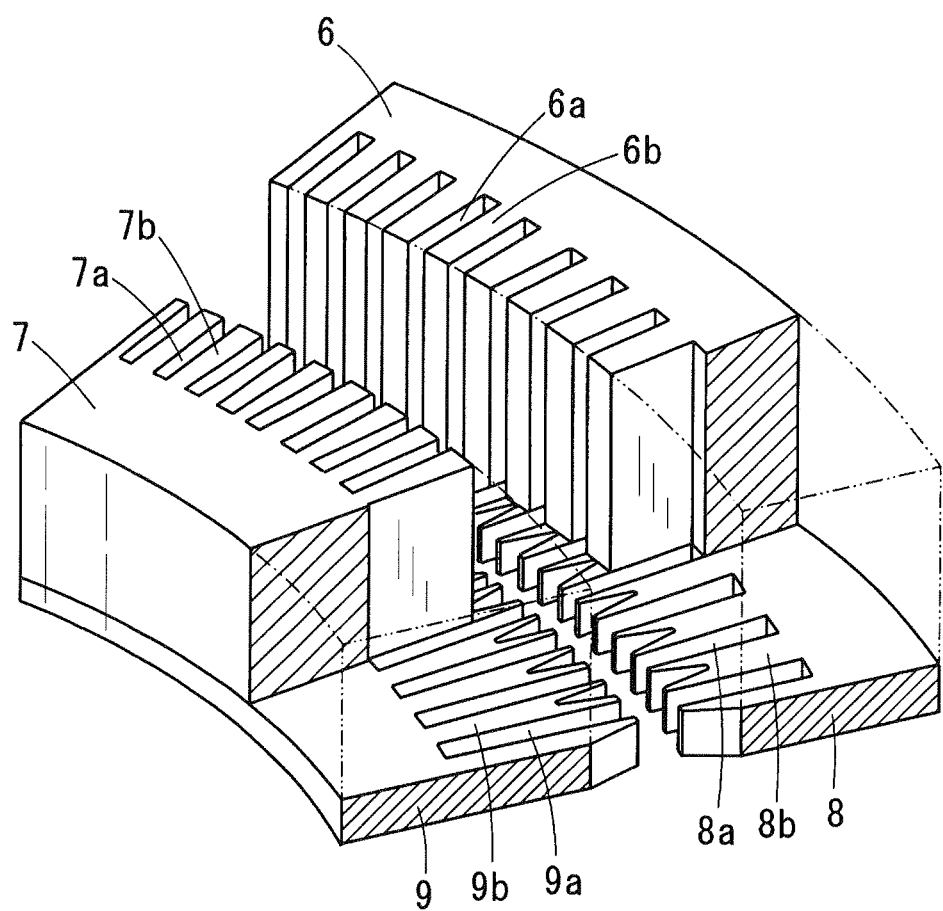
FIG. 3 is a perspective view of part of the stator core.

The outside core 6 is formed by laminating the magnetic steel sheets which have been annularly punched out. As shown in FIG. 2B, the outside core 6 is provided with a plurality of slots 6a in the inner periphery thereof. As shown in FIG. 3, the slots 6a open in the inner periphery of the outside core 6 and are arranged at regular intervals in the circumferential direction. Each tooth 6b is provided between the slots 6a adjacent to each other in the circumferential direction.

The inside core 7 is formed by laminating the magnetic steel sheets which have been annularly punched out. As shown in FIG. 2B, the inside core 7 is provided with a plurality of slots 7a in the outer periphery thereof. As shown in FIG. 3, the slots 7a open in the outer periphery of the inside core 7 and are arranged at regular intervals in the circumferential direction. Each tooth 7b is provided between the slots 7a adjacent to each other in the circumferential direction. Note that, in the present embodiment, the number of the slots of the outside core 6 and the number of the slots of the inside core 7 are the same.

As shown in FIG. 2A, the side cores 8, 9 are separated into the outside and the inside in the radial direction of the stator core. The side core 8 serves as an outside side core connected to one end side in the axial direction of the outside core 6. The side core 9 serves as an inside side core connected to one end side in the axial direction of the inside core 7. Each of the outside side core 8 and the inside side core 9 is formed by laminating magnetic steel sheets.

Figure 4:
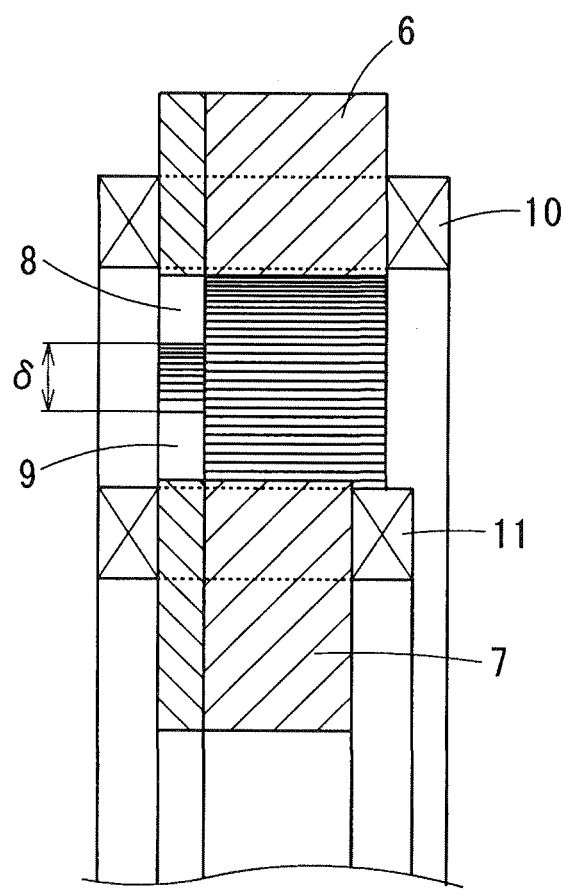
FIG. 4 is a cross-sectional view of a stator.

As shown in FIG. 4, the outside side core 8 has an outer diameter same as that of the outside core 6, and an inner diameter smaller than that of the outside core 6. The portion projecting from the inner periphery end of the outside core 6 to the inside thereof and in the radial direction thereof forms an outer side rotor opposite portion which is opposite to an end face at the outer periphery side in the axial direction of the rotor 4 with a predetermined gap being interposed therebetween.

As shown in FIG. 3, the inner periphery side of the outside side core 8, which is opposite to the end face at the outer periphery side in the axial direction of the rotor 4, is provided with a plurality of slots 8a, which open in the inner periphery of the outer side rotor opposite portion, at regular intervals in the circumferential direction. Each outside tooth 8b is provided between the slots 8a adjacent to each other in the circumferential direction. That is, the outer side rotor opposite portion is configured with a plurality of outside teeth 8b arranged at regular pitches in the circumferential direction via the slots 8a. Note that the number of the slots 8a formed in the outside side core 8 is the same as the number of the slots of the outside core 6. The slots 8a communicate with the slots 6a of the outside core 6 in the axial direction.

As shown in FIG. 4, the inside side core 9 has an inner diameter same as that of the inner core 7, and an outer diameter larger than that of the inside core 7. The portion projecting from the outer periphery end of the inside core 7 to the outside thereof and in the radial direction thereof forms an inner side rotor opposite portion which is opposite to an end face at the inner periphery side in the axial direction of the rotor 4 with a gap being interposed therebetween. As shown in FIG. 3, the outer periphery side of the inside side core 9, which is opposite to the end face at the inner periphery side in the axial direction of the rotor 4, is provided with a plurality of slots 9a, which open in the outer periphery of the inner side rotor opposite portion, at regular intervals in the circumferential direction. Each inside tooth 9b is provided between the slots 9a adjacent to each other in the circumferential direction.

That is, the inner side rotor opposite portion is configured with a plurality of inside teeth 9b arranged at regular pitches via the slots 9a in the circumferential direction. Note that the number of the slots 9a formed in the inside side core 9 is the same as the number of the slots of the inside core 7. The slots 9a communicate with the slots 7a of the inside core 7 in the axial direction.

As shown in FIG. 4, the outside side core 8 and the inside side core 9 are arranged so as to be opposed to each other in the radial direction with a gap δ being interposed between the inner periphery end of the outer side rotor opposite portion (outside teeth 8b) and the outer periphery end of the inner side rotor opposite portion (inside teeth 9b).

Figure 6:
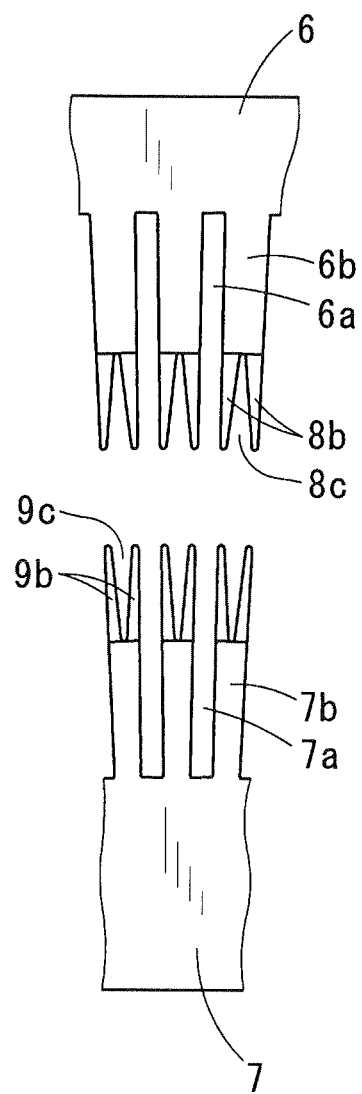
FIG. 6 is a plan view showing a teeth shape of the stator core.

As shown in FIG. 6, the outside teeth 8b configuring the outer side rotor opposite portion are provided with slits 8c which open in the inner periphery end in the radial direction and extend in the radial direction to the outside (upside in FIG. 6). The slit 8c has a tapered shape in which the slit width in the circumferential direction gradually increases from the outer periphery side to the inner periphery side of the outside teeth 8b.

In addition, as shown in FIG. 6, the inside teeth 9b configuring the inner side rotor opposite portion are provided with slits 9c which open in the outer periphery end in the radial direction and extend in the radial direction to the inside (downside in FIG. 6). The slit 9c has a tapered shape in which the slit width in the circumferential direction gradually increases from the inner periphery side to the outer periphery side of the outside teeth 9b.

For example, as shown in FIG. 4, the stator coil includes an outside coil 10 and an inside coil 11. The outside coil 10 is wound across the outside core 6 and the outside side core 8. The inside coil 11 is wound across the inside core 7 and the inside side core 9. Each of the outside coil 10 and the inside coil 11 is formed of, for example, a three-phase coil connected so as to form a star shape. The ends of the three-phase coil are connected to an inverter (not shown).

Figure 5:
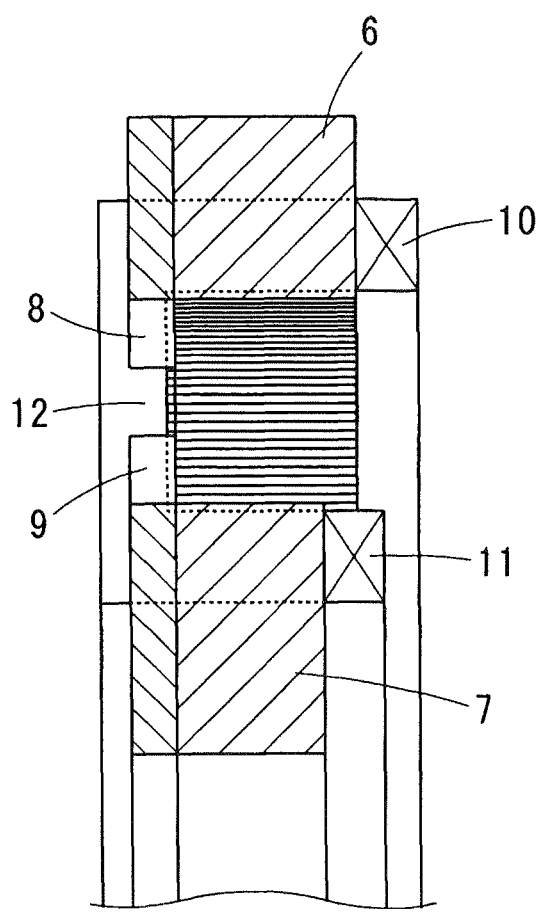
FIG. 5 is a cross-sectional view of a stator, which shows a modification of a stator coil.

As shown in FIG. 5, the stator coil may be provided with a side coil 12 which connects the outside coil 10 and the inside coil 11. The stator coil shown in FIG. 5 is shaped into a cylindrical body whose cross-section shape in the radial direction is a substantial U-shape turned sideways (U-shape turned 90 degrees to the right in FIG. 5). The stator coil is inserted into the slots 6a, 7a, 8a, 9a of the stator core from the right side in FIG. 5 and in the axial direction. Thereby, the stator coil can be easily incorporated into the stator core.

Advantages of the First Embodiment

The motor 1 of the first embodiment has three gaps including an inner radial direction gap, an outer radial direction gap, and an axial direction gap. The inner radial direction gap is provided between the inner periphery of the rotor 4 and the inside core 7. The outer radial direction gap is provided between the outer periphery of the rotor 4 and the outside core 6. The axial direction gap is provided between the end face in the axial direction of the rotor 4 and the side cores 8, 9. Hence, according to the motor 1, compared with the double stator type motor having two gaps disclosed in JP-A-2007-282331, the area increases from which torque is generated, thereby realizing higher output.

In addition, the side cores 8, 9 are separated into the outside side core 8 connected to the outside core 6 and the inside side core 9 connected to the inside core 7. The outside side core 8 and the inside side core 9 are arranged so as to be opposed to each other in the radial direction with a gap 8 being interposed between the inner periphery end of the outside teeth 8b and the outer periphery end of the inside teeth 9b. According to this configuration, in-plane eddy currents in the side cores 8, 9 (large eddy current loop across the outside side core 8 and the inside side core 9) configured by laminating magnetic steel sheets can be eliminated. Hence, even if the side cores 8, 9 are configured by using laminated steel sheets excellent in workability, strength, magnetic properties, manufacturing costs and the like, the losses due to eddy currents can be decreased, thereby providing the motor 1 having higher output and higher efficiency.

In addition, since the outside side core 8 and the inside side core 9 have the outside teeth 8b and the inside teeth 9b provided with the slits 8c and the slits 9c, eddy currents can be decreased which are locally generated at tip portions of the outside teeth 8b and the inside teeth 9b. Hence, the losses due to the eddy currents can be further decreased, thereby providing higher output and higher efficiency.

In addition, since the slits 8c of the outside teeth 8b and the slits 9c of the inside teeth 9b have tapered shapes in which the width of the slits increase toward the tips of the outside teeth 8b and the inside teeth 9b, the slits 8c, 9c can be easily processed by the press.

In addition, by forming the slits 8c and the slits 9c in tapered shapes, the outside teeth 8b and the inside teeth 9b have shapes in which the widths thereof are larger at the roots thereof, and gradually decrease toward the tips thereof. Hence, the vibration transmitted from the outside and the vibration due to magnetic attractive force can be suppressed. As a result, the degradation in performance due to variation of the length of the gaps generated between both the outside teeth 8b and the inside teeth 9b and the rotor 4, the decrease in strength due to repeated vibration, and the noise can be suppressed.

Figure 7:
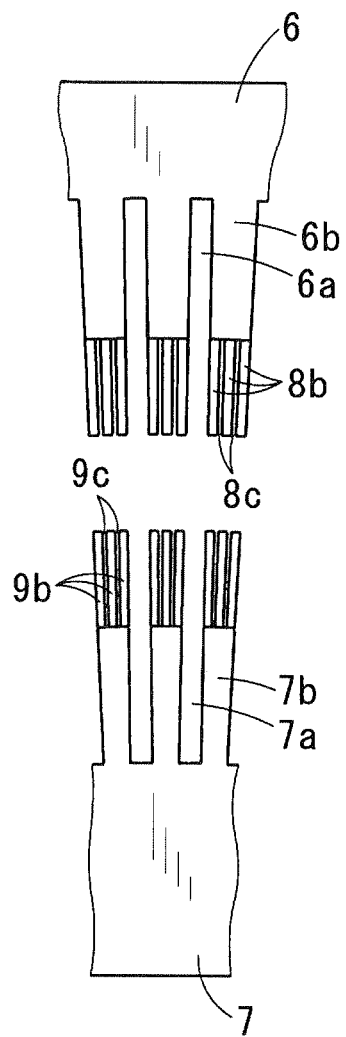
FIG. 7 is a plan view showing a modification of the teeth shape.

Note that, in the first embodiment, one slit 8c and one slit 9c are respectively formed in the outside tooth 8b and the inside tooth 9b. However, the numbers of the slits 8c and the slits 9c are not limited to one. For example, as shown in FIG. 7, a plurality of slits 8c and slits 9c may be formed (in FIG. 6, two). Alternatively, as shown in FIG. 8, the slits 8c and the slits 9c may be eliminated.

Figure 9:
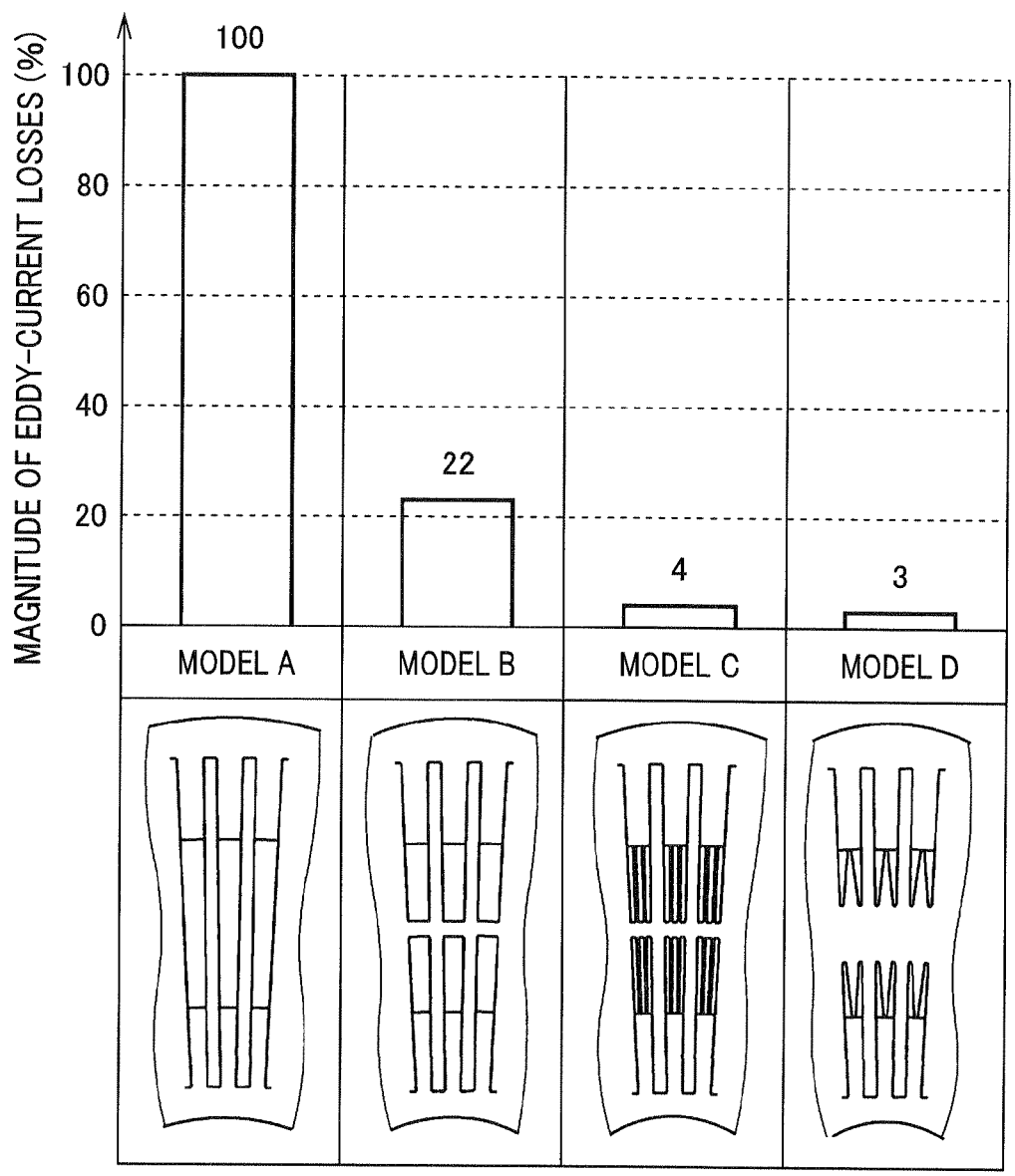
FIG. 9 is a diagram showing a comparison result of simulations in which the magnitude of eddy-current losses is measured in an integrated type side core and a separated type side core.

FIG. 9 shows a result of a verification of the advantages according to the first embodiment.

FIG. 9 shows a result of a simulation in which the magnitudes of the eddy-current losses are compared between an integrated model A in which the side core is not separated into the outside side core 8 and the inside side core 9 and models B, C, D in which the side core is separated into the outside side core 8 and the inside side core 9. Note that, in the model B, slits 8c and 9c are not formed in the outside teeth 8b and the inside teeth 9b. In the model C, two slits 8c, 9c having the same width are formed in the outside teeth 8b and the inside teeth 9b. In the model D, tapered slits 8c and 9c are formed in the outside teeth 8b and the inside teeth 9b.

As obviously shown in the result of FIG. 9, the eddy-current losses of the models B, C, D in which the side core is separated into the outside side core 8 and the inside side core 9 can be smaller than that of the integrated model A in which the side core is not separated. Specifically, in the models C, D in which slits 8c and 9c are formed in the outside teeth 8b and the inside teeth 9b, the eddy-current losses can be decreased significantly.

Second Embodiment

In the second embodiment, the opposite area of the outer side rotor opposite portion (outside tooth 8b) opposite to the end face in the axial direction of the rotor 4 and the opposite area of the inner side rotor opposite portion (inside tooth 9b) opposite to the end face in the axial direction of the rotor 4 are set within a predetermined range.

Figure 10:
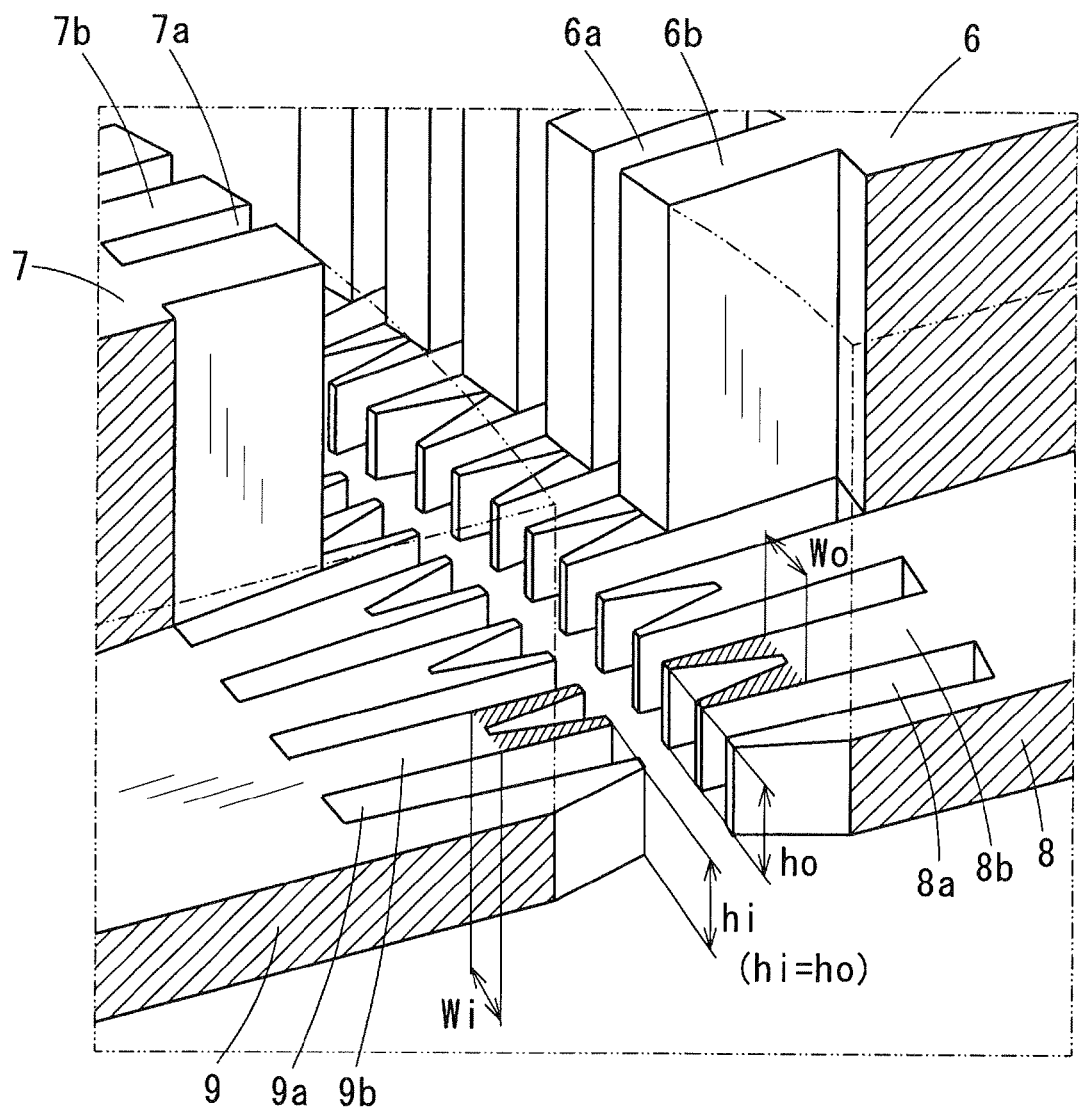
FIG. 10 is a partial enlarged perspective view of a stator core according to a second embodiment.

As shown in FIG. 10, when the opposite area of the outside tooth 8b (the area of the hatched portion in FIG. 10) opposite to the end face in the axial direction of the rotor 4 is So, the width in the circumferential direction of the outside tooth 8b is Wo, the width (thickness) in the axial direction of the outside tooth 8b is ho, and the area obtained by multiplying Wo by ho is S1, the following expression (1) is established:

$$50\% \leq (So/S1) \times 100 \leq 100\% \tag{1}$$

That is, So is set within the range of 50 to 100% with respect to S1.

In addition, when the opposite area of the inside tooth 9b (the area of the hatched portion in FIG. 10) opposite to the end face in the axial direction of the rotor 4 is Si, the width in the circumferential direction of the inside tooth 9b is Wi, the width in the axial direction of the inside tooth 9b is hi (=ho), and the area obtained by multiplying Wi by hi is S2, the following expression (2) is established:

$$50\% \leq (Si/S2) \times 100 \leq 100\% \tag{2}$$

That is, Si is set within the range of 50 to 100% with respect to S2.

FIG. 11A shows shapes of the outside teeth 8b having a cross-sectional ratio (So/S1) of 60% and the inside teeth 9b having a cross-sectional ratio (Si/S2) of 60%. FIG. 11B shows shapes of the outside teeth 8b having a cross-sectional ratio (So/S1) of 80% and the inside teeth 9b having a cross-sectional ratio (Si/S2) of 80%. The opposite area So of the outside tooth 8b and the opposite area Si of the inside tooth 9b in the case of the cross-sectional ratio of 80% are larger than those in the case of the cross-sectional ratio of 60%. In addition, the gap δ provided between the tip of the outside tooth 8b and the tip of the inside tooth 9b in the case of the cross-sectional ratio of 80% is smaller than that in the case of the cross-sectional ratio of 60%.

Figure 12:
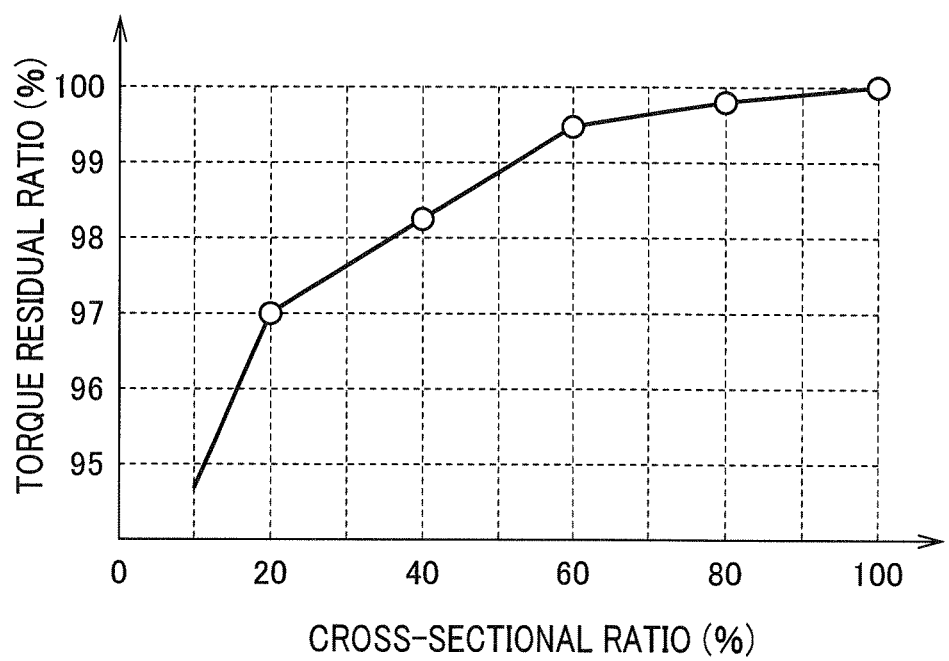
FIG. 12 is a graph showing a relationship between cross-sectional ratios of the teeth and torque residual ratios.

FIG. 12 shows advantages obtained when cross-sectional ratios of the outside teeth 8b and the inside teeth 9b are set within the range of 50 to 100%. FIG. 12 is a result of a simulation in which the correlation between cross-sectional ratios of the outside teeth 8b and the inside teeth 9b and torque residual ratios are verified. In this simulation result, if the cross-sectional ratios of the outside teeth 8b and the inside teeth 9b are within the range of 50 to 100%, the torque residual ratio substantially 99% or more can be obtained. Note that, in the model D shown in FIG. 9 of the first embodiment, the cross-sectional ratios of the outside teeth 8b and the inside teeth 9b are set to 60%. Hence, setting the cross-sectional ratio in the model D to less than 60% further improves the result shown in FIG. 9. That is, the eddy-current losses can be further decreased.

As described above, setting the cross-sectional ratios of the outside teeth 8b and the inside teeth 9b within the range of 50 to 100% can prevent the degradation in performance due to magnetic saturation and the increase in the eddy-current losses due to unnecessary cross sections of magnetic paths, thereby providing higher output and higher efficiency.

Third Embodiment

Figure 14:
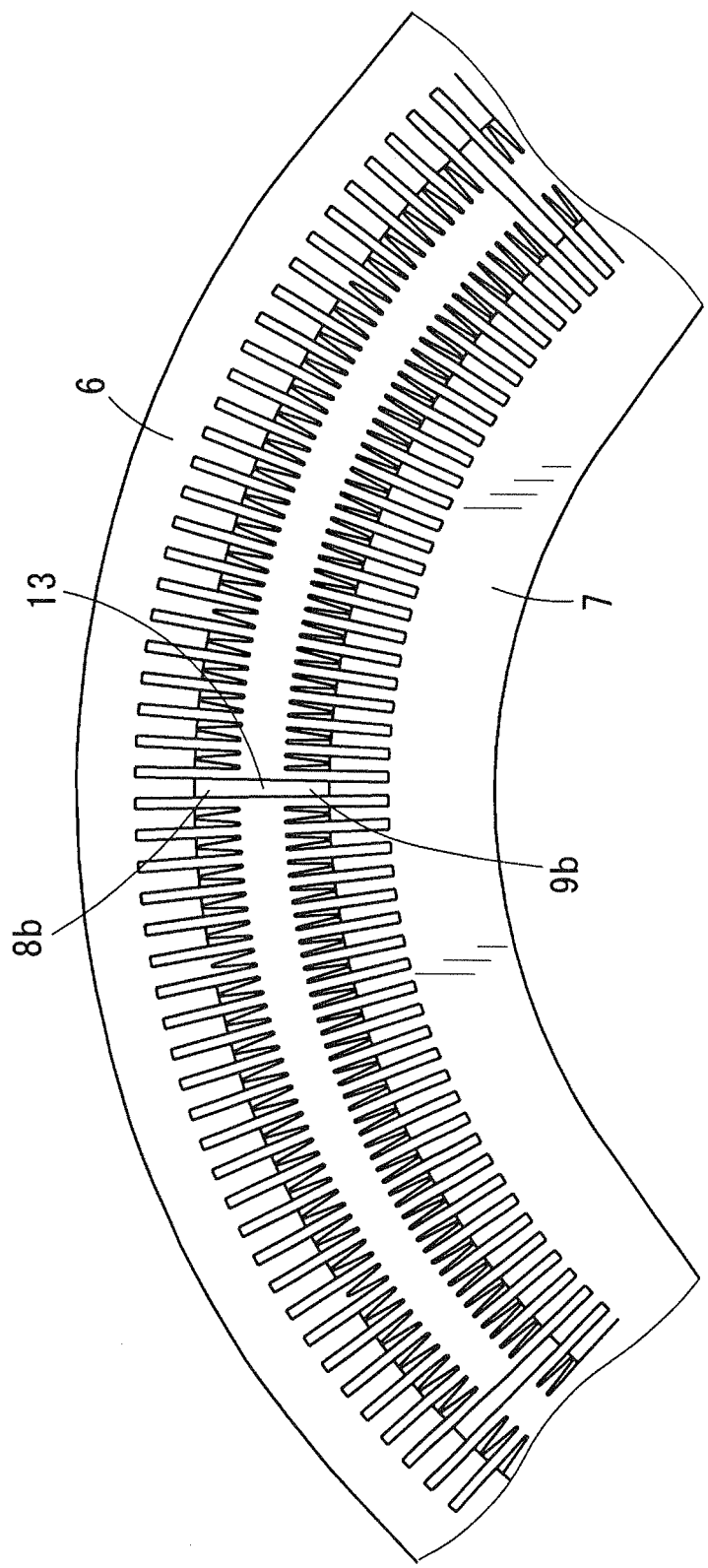
FIG. 14 is an enlarged view showing part of the stator core according to the third embodiment.

In the third embodiment, as shown in FIGS. 13A and 13B, the outside side core 8 and the inside side core 9 are connected via bridges 13. The bridges 13 are provided at regular intervals (e.g. electrical angle 2π pitch) in the circumferential direction. As shown in FIG. 14, the bridges 13 connect between the outside teeth 8b of the outside side core 8 and the inside teeth 9b of the inside side core 9.

Note that the bridge 13 shown in FIGS. 13 and 14 connects between the outside tooth 8b of the outside side core 8 and the inside tooth 9b of the inside side core 9 disposed at the same position in the circumferential direction. However, the teeth disposed at the same position in the circumferential direction are not necessarily connected to each other. The outside tooth 8b and the inside tooth 9b disposed at the different position in the circumferential direction may be connected to each other.

According to the above configuration, the precision of the axes of the outside side core 8 and the inside side core 9 can be improved.

Fourth Embodiment

Figure 15:
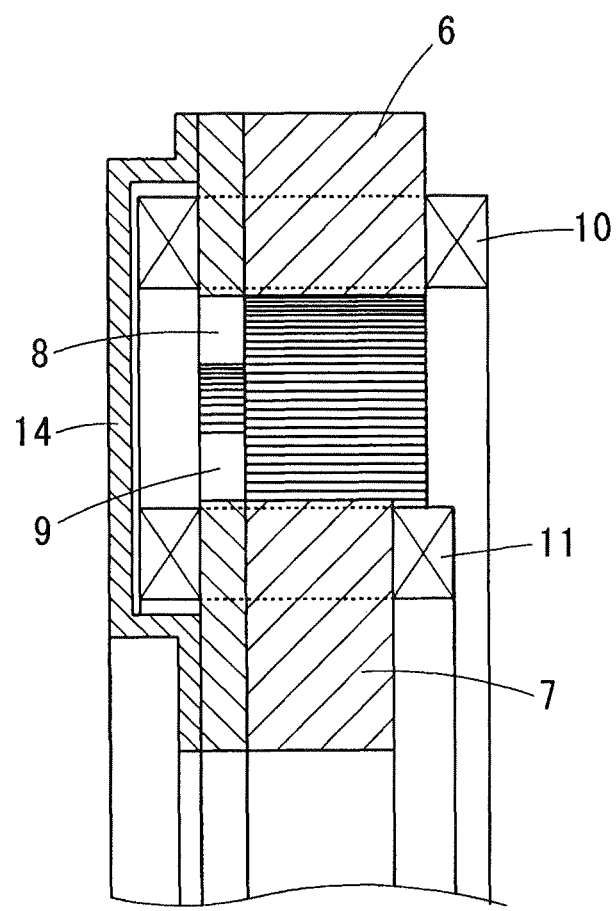
FIG. 15 is a cross-sectional view of a stator according to a fourth embodiment, showing a structure in which an outside side core and an inside side core are connected via a bridge.

In the fourth embodiment 4, as shown in FIG. 15, the outside side core 8 and the inside side core 9 are connected and fixed to each other via a connection member 14.

The connection member 14 is formed by pressing a metal plate into an annular shape. The outer periphery end face in the radial direction of the connection member 14 is fixed to an end face in the axial direction of the outside side core 8 positioned outside the bottom of the slot in the radial direction of the outside side core 8. The inner periphery end face in the radial direction of the connection member 14 is fixed to an end face in the axial direction of the inside side core 9 positioned inside the bottom of the slot in the radial direction of the inside side core 9. Thereby, the outside side core 8 and the inside side core 9 are mechanically connected to each other.

According to the configuration of the fourth embodiment, as in the case of the third embodiment, the precision of the axes of the outside side core 8 and the inside side core 9 can be improved.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a multi-gap type electric rotating machine is provided which includes: an annular rotor which is connected to a rotating shaft and rotates with the rotating shaft; a stator core which includes an outside core disposed at the outside of the rotor in the radial direction with a gap therebetween, an inside core disposed at the inside of the rotor in the radial direction with a gap therebetween, and side cores disposed at one end side in the axial direction of the rotor with gaps; and a stator coil which is wound around the stator core. The side cores include an outside side core connected to one end side in the axial direction of the outside core, and an inside side core connected to one end side in the axial direction of the inside core. The outside side core includes an outer side rotor opposite portion which projects from the inner periphery end of the outside core to the inside thereof and in the radial direction thereof and is opposite to an end face at the outer periphery side in the axial direction of the rotor. The inside side core includes an inner side rotor opposite portion which projects from the outer periphery end of the inside core to the outside thereof and in the radial direction thereof and is opposite to an end face at the inner periphery side in the axial direction of the rotor. The outside side core and the inside side core are arranged so as to be opposed to each other in the radial direction thereof with a gap being interposed between the inner periphery end of the outer side rotor opposite portion and the outer periphery end of the inner side rotor opposite portion.

According to the above configuration, in addition to two radial direction gaps provided between the rotor and both the inside core and the outside core, the axial direction gaps are provided between the rotor and the side gaps. Hence, the area increases from which torque is generated, thereby realizing higher output.

In addition, the side cores are separated into the outside side core connected to the outside core and the inside side core connected to the inside core. Hence, in-plane eddy currents in the side cores (larger eddy current loop across the outside side core and the inside side core) configured by laminating steel sheets can be eliminated. Therefore, even if the side cores are configured by using laminated steel sheets excellent in workability, strength, magnetic properties, manufacturing costs and the like, the losses due to eddy currents can be decreased, thereby providing the multi-gap type electric rotating machine having higher output and higher efficiency.

In the multi-gap type electric rotating machine, the outside side core includes a plurality of slots opening in the inner periphery of the outer side rotor opposite portion, the slots being arranged at regular intervals in the circumferential direction, and outside tooth provided between the slots adjacent to each other in the circumferential direction. The inside side core includes a plurality of slots opening in the outer periphery of the inner side rotor opposite portion, the slots being arranged at regular intervals in the circumferential direction, and inside tooth provided between the slots adjacent to each other in the circumferential direction. The outer side rotor opposite portion is provided with one or more slits which open in the inner periphery end of the outside tooth and extend in the radial direction to the outside. The inner side rotor opposite portion is provided with one or more slits which open in the inner periphery end of the inside tooth and extend in the radial direction toward the inside.

According to the above configuration, since the outside teeth and the inside teeth are provided with the slits, eddy currents can be decreased which are locally generated at tip portions of the outside teeth and the inside teeth. Hence, the losses due to the eddy currents can be further decreased, thereby providing higher output and higher efficiency.

In the multi-gap type electric rotating machine, the slits of the outside teeth have a tapered shape in which the width in the circumferential direction gradually increases to the inner periphery side of the outside teeth. The slits of the inside teeth have a tapered shape in which the width in the circumferential direction gradually increases to the outer periphery side of the inside teeth.

According to the above configuration, the slits of the outside teeth and the inside teeth have tapered shapes. Hence, the slits can be easily processed by the press.

In addition, since the outside teeth and the inside teeth have shapes in which the thicknesses thereof are larger at the roots thereof, and gradually decrease toward the tips thereof, the vibration transmitted from the outside and the vibration due to magnetic attractive force can be suppressed. As a result, the degradation in performance due to variation of the length of the gaps, the decrease in strength due to repeated variation, and the noise can be suppressed.

In the multi-gap type electric rotating machine, an opposite area of the outside tooth opposite to the end face in the axial direction of the rotor is set within the range of 50 to 100% with respect to an area obtained by multiplying a width in the circumferential direction of the outside tooth by a width in the axial direction of the outside tooth. An opposite area of the inside tooth opposite to the end face in the axial direction of the rotor is set within the range of 50 to 100% with respect to an area obtained by multiplying a width in the circumferential direction of the inside tooth by a width in the axial direction of the inside tooth.

According to the above configuration, the degradation in performance due to magnetic saturation and the increase in the eddy-current losses due to unnecessary cross sections of magnetic paths can be prevented, thereby providing further higher output and higher efficiency.

What is claimed is:

1. A multi-gap type electric rotating machine, comprising:
    an annular rotor;
    a stator core that includes an outside core disposed at the outside of the rotor in the radial direction with a gap therebetween, an inside core disposed at the inside of the rotor in the radial direction with a gap therebetween, and side cores disposed at one end side in the axial direction of the rotor with gaps; and
    a stator coil that is wound around the stator core, wherein the side cores include an outside side core connected to one end side in the axial direction of the outside core, and an inside side core connected to one end side in the axial direction of the inside core,
    the outside side core includes an outer side rotor opposite portion that projects from the inner periphery end of the outside core to the inside thereof and in the radial direction thereof and is opposite to an end face at the outer periphery side in the axial direction of the rotor,
    the inside side core includes an inner side rotor opposite portion that projects from the outer periphery end of the inside core to the outside thereof and in the radial direction thereof and is opposite to an end face at the inner periphery side in the axial direction of the rotor, and
    the outside side core and the inside side core are arranged so as to be opposed to each other in the radial direction thereof with a gap being interposed between the inner periphery end of the outer side rotor opposite portion and the outer periphery end of the inner side rotor opposite portion.

2. The multi-gap type electric rotating machine according to claim 1, wherein the outside side core includes a plurality of slots opening in the inner periphery of the outer side rotor opposite portion, the slots being arranged at regular intervals in the circumferential direction, and outside teeth provided between the slots adjacent to each other in the circumferential direction,
    the inside side core includes a plurality of slots opening in the outer periphery of the inner side rotor opposite portion, the slots being arranged at regular intervals in the circumferential direction, and inside teeth provided between the slots adjacent to each other in the circumferential direction,
    the outer side rotor opposite portion is provided with one or more slits that open in the inner periphery end of the outside tooth and extend in the radial direction to the outside, and the inner side rotor opposite portion is provided with one or more slits that open in the inner periphery end of the inside tooth and extend in the radial direction toward the inside.

3. The multi-gap type electric rotating machine according to claim 2, wherein the slits of the outside teeth have a tapered shape that has a width in the circumferential direction gradually increases to the inner periphery side of the outside teeth, and the slits of the inside teeth have a tapered shape that has a width in the circumferential direction gradually increases to the outer periphery side of the inside teeth.

4. The multi-gap type electric rotating machine according to claim 2, wherein an opposite area of the outside tooth opposite to the end face in the axial direction of the rotor is set within the range of 50% to 100% with respect to an area obtained by multiplying a width in the circumferential direction of the outside tooth by a width in the axial direction of the outside tooth, and an opposite area of the inside tooth opposite to the end face in the axial direction of the rotor is set within the range of 50% to 100% with respect to an area obtained by multiplying a width in the circumferential direction of the inside tooth by a width in the axial direction of the inside tooth.

5. The multi-gap type electric rotating machine according to claim 3, wherein an opposite area of the outside tooth opposite to the end face in the axial direction of the rotor is set within the range of 50% to 100% with respect to an area obtained by multiplying a width in the circumferential direction of the outside tooth by a width in the axial direction of the outside tooth, and an opposite area of the inside tooth opposite to the end face in the axial direction of the rotor is set within the range of 50% to 100% with respect to an area obtained by multiplying a width in the circumferential direction of the inside tooth by a width in the axial direction of the inside tooth.

* * * * *